United States Patent Office 2,983,735
Patented May 9, 1961

2,983,735
PROCESS FOR THE PREPARATION OF 17β-HYDROXY-17α-VINYL STEROIDS OF THE ESTRANE SERIES

Pietro de Ruggieri, Milan, and Carlo Ferrari, Bergamo, Italy, assignors to Ormonoterapia Richter S.p.A., Via Chioggia, Milan, Italy No Drawing. Filed May 20, 1958, Ser. No. 736,458

4 Claims. (Cl. 260—397.4)

The present invention relates to the preparation of compounds having the general structural formula

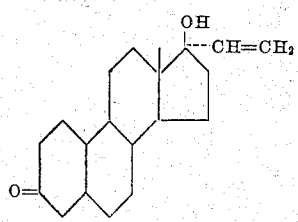

wherein a double bond is present between the carbon atoms 5 and 10 or 4 and 5, and exhibiting therapeutic activity as estrogenic, progestational and anabolic agents.

Such compounds are prepared with a new procedure by which 3-methoxy-17α-ethynyl-1,3,5(10)-estratriene-17β-ol is subjected to a modified Birch reduction.

The normal Birch reduction with sodium, potassium or lithium (the last one used by A. L. Wilds and N. A. Nelson, J. Am. Chem. Soc. 75, 5360, 5366; 1953), and alcohol in liquid ammonia, when applied to 3-methoxy-17α-ethynyl-1,3,5(10)-estratriene-17β-ol involves its reduction to 3-methoxy-estra-2,5(10)-diene as well as the reduction of the ethynyl to the vinyl group, thus affording, by subsequent hydrogenolysis, 3-methoxy-17-ethyliden-2,5(10)-estradiene. This reaction course is described in the chemical literature for the non-steroidal ethynylcarbinols (A. J. Birch, J. Chem. Soc. 1944, 430; ibidem 1945, 809) as well as for the 3-methoxy-17α-ethynyl-1,3,5(10)-estratriene-17β-ol (F. B. Colton, J. Am. Chem. Soc. 79, 1123, 1957).

The claimed procedure involves reacting 3-methoxy-17α-ethynyl-1,3,5(10)-estratriene-17β-ol in liquid ammonia with an excess of sodium-, potassium- or lithium-amide, so that the corresponding sodium, potassium or lithium salts in 17β and 21 are formed. By this expedient, which is practiced in the same reaction vessel, the hydrogenolysis during the subsequent reduction with lithium and alcohol is avoided; the reaction product is then hydrolysed with oxalic or acetic acid in methanol or ethanol solution, thereby producing 17α-vinyl-5(10)-estrene-17α-ol-3-one and alternatively with hydrochloric acid, furnishing 17α-vinyl-4-estrene-17β-ol-3-one.

The following examples are given for purposes of illustration and are not to be construed as limiting the present invention.

Example 1

0.125 part of lithium in small pieces is added, little by little, to 100 parts of liquid ammonia in the presence of one crystal of ferric nitrate; a blue color develops, which disappears after about 20 minutes owing to the formation of the lithium-amide. A solution of 1 part of 3-methoxy-17α-ethynyl-1,3,5(10)-estratriene-17β-ol in 50 parts of anhydrous diethyl ether is then added over a period of 30 minutes, and the suspension is stirred for an additional 90 minutes; thereafter 1 part of lithium in small pieces is added over a period of about 20 minutes and stirring is continued for another 30 minutes. The resulting solution is then carefully treated with absolute ethanol over a period of 20 minutes, after which the ammonia is evaporated and the residue, diluted with water, is extracted with diethyl ether. The ethereal extract, washed with water and dried over sodium sulphate is evaporated to dryness.

The residue, dissolved in 90 parts of methanol, is treated for 40 minutes at 25° C. with 1.3 parts of bihydrated oxalic acid in 16.5 parts of water.

After diluting with water, the solution is repeatedly extracted with diethyl ether, the combined extracts are washed with aqueous sodium bicarbonate followed by water, dried over sodium sulphate and evaporated to dryness. The crystallization of the residue from diethyl-ether-hexane is productive of 0.8 part of 17α-vinyl-5(10)-estrene-17β-ol-3-one, with a melting point of 142°–143° C., an optical rotation of +161° (chloroform) and the analysis given below.

Found, percent: C, 79.86; H, 9.42. For $C_{20}H_{28}O_2$, calc'd: C, 79.95; H, 9.39.

Example 2

0.125 part of lithium in small pieces is added, little by little, to 100 parts of liquid ammonia in the presence of one crystal of ferric nitrate; a blue color develops, which disappears after about 20 minutes owing to the formation of the lithium-amide. A solution of 1 part of 3-methoxy-17α-ethynyl-1,3,5(10)-estratriene-17β-ol in 50 parts of anhydrous diethyl ether is then added over a period of 30 minutes and the suspension is stirred for an additional 90 minutes; thereafter 1 part of lithium in small pieces is added over a period of about 20 minutes and stirring is continued for another 30 minutes. The resulting solution is then carefully treated with absolute ethanol over a period of 20 minutes, after which the ammonia is evaporated and the residue, diluted with water, is extracted with diethyl ether. The ethereal extract, washed with water and dried over sodium sulphate is evaporated to dryness.

To the boiling suspension of the residue in 40 parts of methanol, 20 parts of 3 N hydrochloric acid are added and the resulting solution is slowly cooled down to 20° C. in about 45 minutes. Water is added and the mixture extracted several times with diethyl ether, the combined extracts are washed with aqueous sodium bicarbonate followed by water, dried over sodium sulphate and concentrated until crystals begin to separate.

0.85 part of 17α-vinyl-4-estrene-17β-ol-3-one is thus obtained with a melting point of 164°–166° C. and an optical rotation of +27° (chloroform).

Example 3

The same procedure is applied as given in Examples 1 and 2, except that 0.415 part of sodium is used instead of 0.125 part of lithium, thus producing the sodium-amide.

Example 4

The same procedure is applied as given in Examples 1 and 2, except that 0.705 part of potassium is used instead of 0.125 part of lithium, thus producing the potassium-amide.

We claim:
1. A method for preparing the compound having the formula

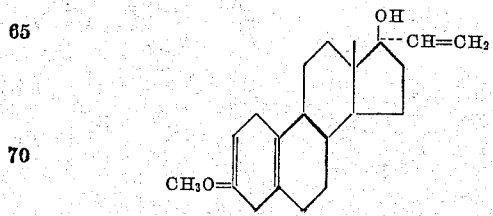

which comprises adding 3-methoxy-17α-ethynyl-1,3,5-(10)-estratriene-17β-ol to a previously prepared solution of a compound selected from the group consisting of sodium, potassium and lithium amides in liquid ammonia, to produce the corresponding alkali metal salts in the 17β- and 21-positions and contacting the alkali metal-containing compound with lithium and ethanol to reduce said last-mentioned compound and form said first-mentioned compound.

2. The method of claim 1 wherein the reaction product dissolved in an alcohol selected from the group consisting of methanol and ethanol is hydrolyzed in the presence of an inorganic acid to produce 17α-vinyl-4-estrene-17β-ol-3-one.

3. The method of claim 2 wherein said inorganic acid is hydrochloric acid.

4. The method of claim 1 wherein the reaction product dissolved in an alcohol selected from the group consisting of methanol and ethanol is hydrolyzed in the presence of an organic acid selected from the group consisting of oxalic and acetic acids to produce 17α-vinyl-5(10)-estrene-17β-ol-3-one.

References Cited in the file of this patent
UNITED STATES PATENTS

| | | |
|---|---|---|
| 2,655,518 | Colton | Oct. 13, 1953 |
| 2,843,608 | Colton | July 15, 1958 |
| 2,905,676 | Colton | Sept. 22, 1959 |